US010790709B2

(12) United States Patent
Cheikh

(10) Patent No.: US 10,790,709 B2
(45) Date of Patent: Sep. 29, 2020

(54) NEAR-FIELD COMMUNICATION AND APPROACH DETECTION DEVICE

(71) Applicants: Continental Automotive France, Toulouse (FR); Continental Automotive GmbH, Hannover (DE)

(72) Inventor: Mohamed Cheikh, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/489,391

(22) PCT Filed: May 17, 2018

(86) PCT No.: PCT/FR2018/051184
§ 371 (c)(1),
(2) Date: Aug. 28, 2019

(87) PCT Pub. No.: WO2018/211220
PCT Pub. Date: Nov. 22, 2018

(65) Prior Publication Data
US 2020/0119597 A1 Apr. 16, 2020

(30) Foreign Application Priority Data
May 19, 2017 (FR) .................................... 17 54483

(51) Int. Cl.
*H02J 50/80* (2016.01)
*H02J 50/12* (2016.01)
(Continued)

(52) U.S. Cl.
CPC .............. *H02J 50/80* (2016.02); *H01F 38/14* (2013.01); *H02J 7/02* (2013.01); *H02J 50/12* (2016.02);
(Continued)

(58) Field of Classification Search
CPC ....................................................... H02J 50/80
(Continued)

(56) References Cited

U.S. PATENT DOCUMENTS

| 10,181,746 B2* | 1/2019 | Kramer | H02J 7/025 |
| 2009/0021211 A1* | 1/2009 | Zhang | H02J 7/0044 |
| | | | 320/108 |

(Continued)

FOREIGN PATENT DOCUMENTS

EP    3065304 A1    9/2016

OTHER PUBLICATIONS

English Translation of the Written Opinion for International Application No. PCT/FR2018/051184, dated Sep. 28, 2018, 5 pages.
(Continued)

*Primary Examiner* — Jerry D Robbins
(74) *Attorney, Agent, or Firm* — RatnerPrestia

(57) ABSTRACT

An apparatus for detecting the approach of a mobile device and for near-field communication with the device, includes an NFC antenna under a receiving surface, at least one matching component and an electronic control unit connected by a power supply line and capable of near-field communication with the mobile device. The detection apparatus includes: at least one conductive element; a selector, located on each side of the component and on each side of the conductive element, each having two positions: in a first position the component is connected to the power supply line and the conductive element is not; in a second position the conductive element is connected to the power supply line and the component is not; measuring a variation in an electrical parameter of the conductive element when the two selectors are in the second position to detect the approach of the mobile device toward the receiving surface.

8 Claims, 6 Drawing Sheets

(51) Int. Cl.
   *H02J 50/40* (2016.01)
   *H01F 38/14* (2006.01)
   *H02J 7/02* (2016.01)
   *H04B 5/00* (2006.01)

(52) U.S. Cl.
   CPC ............ *H02J 50/40* (2016.02); *H04B 5/0037* (2013.01); *H04B 5/0081* (2013.01)

(58) Field of Classification Search
   USPC ........................................................ 320/108
   See application file for complete search history.

(56) References Cited

U.S. PATENT DOCUMENTS

| | | | |
|---|---|---|---|
| 2014/0035523 A1* | 2/2014 | Winget | ................. B60L 11/182 320/108 |
| 2015/0178526 A1 | 6/2015 | Roh et al. | |
| 2016/0087485 A1* | 3/2016 | Maeda | ................... H02J 7/025 455/573 |
| 2016/0164335 A1* | 6/2016 | Kanahara | ................ H02J 50/40 320/108 |
| 2017/0098149 A1 | 4/2017 | Kesler et al. | |
| 2017/0317405 A1 | 11/2017 | Han et al. | |

OTHER PUBLICATIONS

International Search Report and Written Opinion for International Application No. PCT/FR2018/051184, dated Sep. 28, 2018—8 pages.

* cited by examiner

NEAR-FIELD COMMUNICATION AND APPROACH DETECTION DEVICE

CROSS REFERENCE TO RELATED APPLICATIONS

This application is the U.S. National Phase Application of PCT International Application No. PCT/FR2018/051184, filed May 17, 2018, which claims priority to French Patent Application No. 1754483, filed May 19, 2017, the contents of such applications being incorporated by reference herein.

FIELD OF THE INVENTION

The invention relates to a near-field communication and approach-detection apparatus. More particularly, the invention is applicable to inductive chargers for mobile devices, these chargers being intended to be installed on board a motor vehicle and including a near-field communication apparatus for communication with a mobile device once said device has been placed on the receiving surface of the inductive charger.

BACKGROUND OF THE INVENTION

Magnetic coupling charging apparatuses, which make it possible to wirelessly charge mobile devices (cellphones, laptop computers, touchscreen tablets, digital cameras, etc.), are currently experiencing significant growth.

Conventionally, a magnetic coupling charging apparatus includes a conductor coil, called "primary antenna", which is connected to a charging module. During charging of a mobile device, the charging module forms a charging signal that makes it possible to channel an electric current, the intensity of which varies over time, through the primary antenna. The primary antenna that is thus supplied forms a variable magnetic field.

The mobile device includes a receiver module including a conductive coil, referred to as the "secondary antenna". When said secondary antenna is placed within the variable magnetic field formed by the primary antenna, an electric current is induced in said secondary antenna. This electric current makes it possible to charge an electrical accumulator connected to the secondary antenna, thus supplying current to the mobile device.

It is known practice to place a mobile device on a charging apparatus so as to charge the mobile device through induction, and so that it communicates at the same time as or after the charging period by near-field communication (NFC) with the electronic system on board the vehicle. This short-distance wireless communication (generally over a distance of a few millimeters) makes it possible, among other things, for the vehicle to download a particular user profile contained in the mobile device and thus to adjust elements of the vehicle according to this profile, for example to adjust the position of the driver seat in the vehicle, to program favorite radio stations, to modify the appearance of the instrument panel or to activate the "E-call" (emergency-call) function, etc.

To this end and as is known, these charging apparatuses comprise a dedicated radiofrequency antenna for inductive charging, referred to as the charging antenna, which is a WPC (Wireless Power Consortium) antenna, i.e. a wireless inductive charging antenna in accordance with the standards of this consortium, allowing inductive charging at frequencies ranging from 100 to 200 kHz, as well as another antenna of higher frequency, generally around 13.56 MHz, that is dedicated to this near-field communication. It may also be any other radiofrequency antenna allowing communication by short-distance coupling between the mobile device and the charging apparatus that is connected to the electronic system on board the vehicle.

It is known practice to detect the approach of a mobile device by transmitting a ping generated by the charging apparatus and emitted by the WPC charging antenna. This ping consists of a current or voltage pulse that is emitted periodically, for example every 100 ms, and for a very short duration, for example 30 μs, so as to save energy. Said ping is an interrogation signal that generates an electromagnetic field in proximity to the primary antenna.

Thus, when a compatible mobile device is placed in proximity to the charging apparatus, it modifies the electromagnetic field generated while the interrogation signal is being emitted, thereby forming a coupling between the primary antenna of the charging apparatus and the secondary antenna of the mobile device. This coupling, which modifies the intensity of the current flowing through the primary antenna, is detected by the charging apparatus, which thus deduces therefrom that a compatible device is in proximity.

Once a compatible device has been detected, the charging apparatus transmits an authentication request signal. This authentication request signal includes a request to authenticate the mobile device, which in return responds to the charging apparatus by sending a response signal including its identifier. Once the identifier has been recognized, charging and/or communication may commence.

However, this method is very energy intensive. Moreover, it periodically emits electromagnetic radiation into the passenger compartment of the vehicle, and automotive vehicle manufacturers now require the exposure of the driver to electromagnetic radiation to be limited as far as is possible, so as to adhere to the recommendations of the ICNIRP (International Commission on Non-Ionizing Radiation Protection) or to those of the IEEE (Institute of Electrical and Electronics Engineers) relating to the levels of exposure of the human body to electromagnetic radiation.

It is also known practice to detect the presence of a mobile device using the variation in voltage or phase across the terminals of the NFC antenna. However, said NFC charging antenna is designed, in a charging apparatus, to provide long-term communication (and not just an identifier exchange, as is the case for vehicle access for example). Such an antenna is therefore designed to be insensitive to the presence of a mobile device in proximity, in this instance to the metal parts that are located within the mobile device, and, when said mobile device is present on the receiving surface, it is designed to exhibit little or no variation in voltage (or in phase) across its terminals so as to be able to ensure stable and effective communication with said device. In this instance, the NFC antenna is connected to a matching circuit that is optimized to provide stable communication with mobile devices, said circuit being designed to ensure impedance stability at a short communication distance. In other words, the impedance of the matching circuit is stable and varies only slightly with the approach of a mobile device.

For this purpose of ensuring stable and effective communication, it is known practice to use electronic components in the NFC antenna that are not composed of conductive metals and hence are substantially or entirely insensitive to a nearby magnetic environment, i.e. to ferromagnetic or metal elements. In this instance, it is known practice to use components. This is illustrated in FIG. 1. These electronic components are passive elements and comprise, in a manner known per se: matching capacitors and/or inductors thus forming an LC circuit, i.e. a circuit resonating at the near-field communication frequency, i.e. 13.56 MHz.

However, as explained above, the use of matching components for the NFC antenna that are substantially or entirely insensitive to electromagnetic fields does not enable the approach of a mobile device to be detected by said NFC antenna in a reliable and robust manner.

SUMMARY OF THE INVENTION

An aspect of the invention provides a near-field communication and approach-detection apparatus allowing the drawbacks of the prior art to be overcome.

More specifically, an aspect of the invention provides a near-field communication and approach-detection apparatus that not only makes it possible to provide stable and effective near-field communication when the mobile device is placed on the receiving surface of the charging apparatus, but also makes it possible to accurately detect the approach of said mobile device toward the charging apparatus in a reliable and robust manner.

An aspect of the invention provides an apparatus for detecting the approach of a mobile device and for near-field communication with said device, comprising an NFC antenna that is arranged under a receiving surface that is suitable for receiving said mobile device, at least one matching component and an electronic control unit, the control unit, the component and the NFC antenna being electrically connected to one another by a power supply line and being capable of near-field communication with the mobile device, said detection apparatus being noteworthy in that it further comprises:

at least one conductive element, under the receiving surface;

selection means, located on each side of the component and on each side of the conductive element, each having two positions:

a first position in which the component is connected to the power supply line and the conductive element is disconnected from the power supply line;

a second position in which the conductive element is connected to the power supply line and the component is disconnected from the power supply line;

means for measuring a variation in an electrical parameter of the conductive element when the two selection means are in the second position so as to detect the approach of said mobile device toward the receiving surface;

control means for the selection means.

Judiciously, the NFC antenna defining a first plane, the conductive element is located in a second plane that runs parallel to the first plane.

Preferably, if the component is an inductor, then the conductive element takes the form of a coil.

Similarly, if the component is a capacitor, then the conductive element takes the form of an electrode.

Preferably, the component taking a predetermined physical value, then the conductive element is adjusted so as to take substantially the same predetermined physical value.

An aspect of the invention also relates to a near-field communication and approach-detection method using a near-field communication and approach-detection apparatus comprising an NFC antenna that is located under a receiving surface that is suitable for receiving the mobile device, at least one matching component and an electronic control unit, the control unit, the component and the NFC antenna being electrically connected to one another by a power supply line, and being capable of near-field communication with the mobile device, the method comprising a phase of detecting said mobile device in which:

the component is disconnected from the power supply line;

instead of the component, a conductive element that is located under the receiving surface is connected to the power supply line;

variations in an electrical parameter of the conductive element are measured so as to detect the approach of the mobile device toward the receiving surface.

The method also comprises a communication phase in which if a mobile device is detected on the receiving surface, then:

the conductive element is disconnected from the power supply line; and the component is reconnected to the power supply line, so as to communicate with said mobile device.

Preferably, the component taking a predetermined physical value when it is connected to the power supply line, the conductive element is adjusted so that it takes substantially the same physical value when it is connected to the power supply line.

An aspect of the invention applies also to any inductive charger for a mobile device comprising a near-field communication and approach-detection apparatus according to any one of the features given above.

An aspect of the invention applies also to any motor vehicle comprising a near-field communication and approach-detection apparatus according to any one of the features given above.

BRIEF DESCRIPTION OF THE DRAWINGS

Other aims, features and advantages of aspects of the invention will become apparent upon reading the following description provided by way of nonlimiting example and upon examining the appended drawings, in which.

DETAILED DESCRIPTION OF THE PREFERRED EMBODIMENTS

Figure 1:
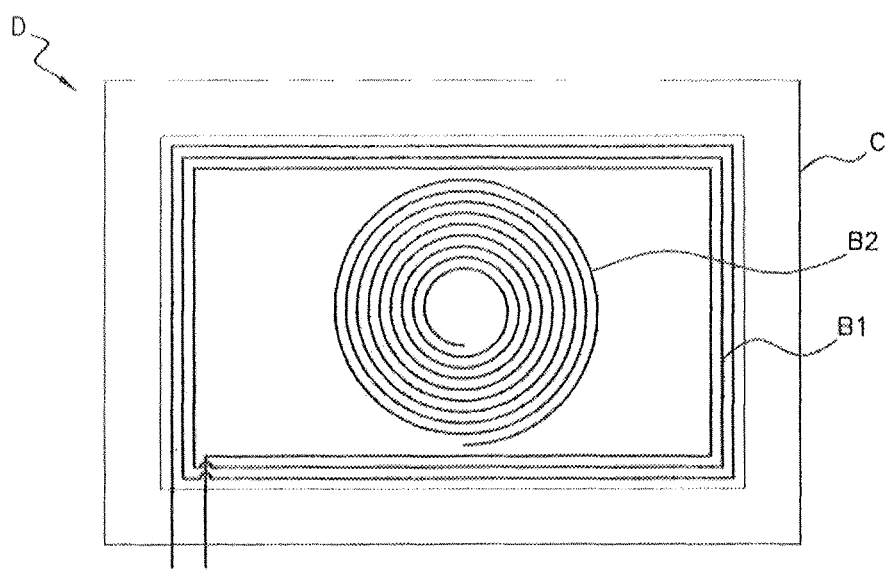
FIG. 1 shows a top view of an inductive charger comprising an apparatus for detecting the approach of a mobile device and for communication with said device, according to the prior art.

FIG. 1 shows a near-field communication and approach-detection apparatus D that is incorporated, in the example illustrated in FIG. 1, within an inductive charger C, said inductive charger C being intended to be installed on board a motor vehicle (not shown) for the purpose of induction-charging a mobile user device P, such as a cellphone or a tablet, once said mobile device P has been placed on a receiving surface of the charger C.

According to the prior art, near-field communication between said apparatus p and a mobile device P takes place via an NFC antenna B1 that is located under the receiving surface S and connected to a control unit, for example a microcontroller 10, and to at least one matching component L1, L2, C1, C2, C3, C4.

The control unit 10 manages the transmission and reception of the data transmitted by NFC by the NFC antenna B1. This is known to those skilled in the art.

The NFC antenna B1 is for example etched onto a first printed circuit board 100 (see FIG. 2) under the receiving surface S.

Said component consists of at least one inductor L1, L2 and/or at least one capacitor C1, C2, C3, C4.

Figure 2:
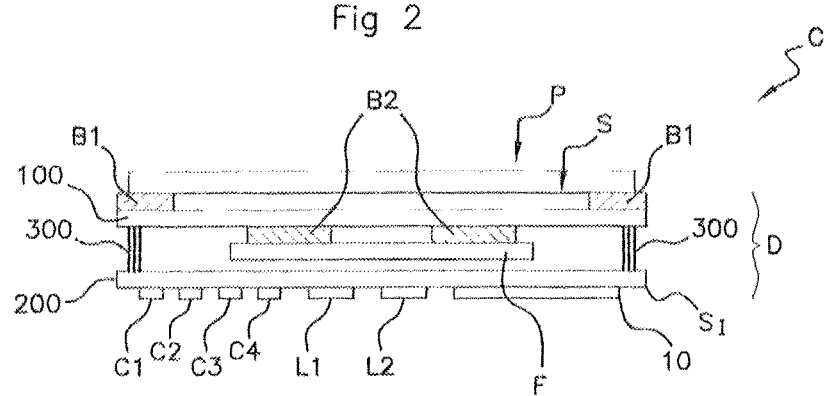
FIG. 2 shows a sectional view of the inductive charger comprising the approach-detection and communication apparatus, illustrated in FIG. 1, according to the prior art.
Figure 3:
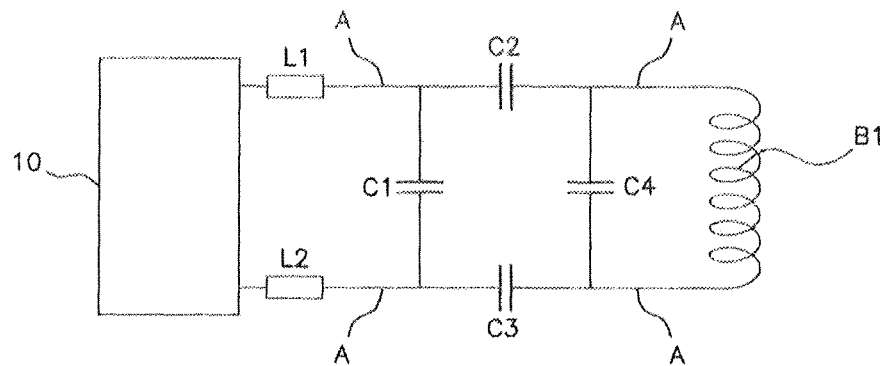
FIG. 3 shows a circuit comprising an NFC antenna, components and an electronic unit, according to the prior art, for communication with the mobile device.

In the example illustrated in FIGS. 2 and 3, the approach-detection and communication apparatus D comprises two inductors, a first inductor L1 and a second inductor L2, and four capacitors, a first capacitor C1, a second capacitor C2, a third capacitor C3 and a fourth capacitor C4.

The first and second inductors are filtering inductors, made of ceramic for example.

The first capacitor C1 is a filtering capacitor and the second, third and fourth capacitors C2, C3, C4 are impedance-matching capacitors, also made of ceramic.

The electronic circuit illustrated in FIG. 3 is known to those skilled in the art. The NFC antenna B1 is connected to the microcontroller 10 by a power supply line A comprising said two inductors L1, L2 and said four capacitors C1, C2, C3, C4. The NFC antenna B1 thus electrically connected allows near-field communication with the mobile device P at a frequency of 13.56 MHz, or communication therewith by coupling at any frequency close to 13.56 MHz.

The components L1, L2, C1, C2, C3, C4 and the microcontroller 10 are for example located on a lower face $S_I$ of the device D, on a second printed circuit board 200 (see FIG. 2).

The circuit composed of the NFC antenna B1, of the components L1, L2, C1, C2, C3, C4 and of the control unit 10 is designed to communicate effectively with the mobile device P once this device has been placed on the receiving surface S.

Specifically, said components conduct little or no electricity and are substantially or entirely insensitive to the electromagnetic field created between the NFC antenna B1 and the mobile device P, and hence the circuit is subject to little or no impedance or frequency mismatching when the mobile device P is brought toward the apparatus D.

A drawback of this, when the mobile device P is brought toward the apparatus D, is that the variation in voltage across the terminals of the NFC antenna B1 remains small and is not enough to ensure reliable and robust detection of the approach of said device.

It is therefore known practice for the approach of the mobile device P to be detected by the charging antenna B2. The charging antenna B2 is located under the receiving surface S, on top of a ferrite F, and is connected to the microcontroller 10 via the second printed circuit board 200 (see FIG. 2).

The first printed circuit board 100 and the second printed circuit board 200 are electrically connected to one another by metal connectors 300 (see FIG. 2).

Said charging antenna B2 may be a WPC (Wireless Power Consortium) antenna that, by transmitting pings, i.e. electromagnetic pulses, at a fixed frequency and by measuring the voltage across the terminals of the charging antenna B2, allows the approach of the mobile device P to be detected. This is known to those skilled in the art and has the drawback of consuming power and of maintaining a constant and high level of electromagnetic emissions within the vehicle, to the detriment of the health of the user.

An aspect of the invention therefore provides a near-field communication and approach-detection apparatus D allowing:

in the detection phase, the approach of the mobile device P to be detected reliably while minimizing the level of radiation in the passenger compartment and the consumption of said apparatus D; and in the communication phase, stable and effective communication between the mobile device P and said apparatus D.

To this end, an aspect of the invention provides a near-field communication and approach-detection apparatus D', illustrated in FIGS. 4 to 7.

Figure 4:
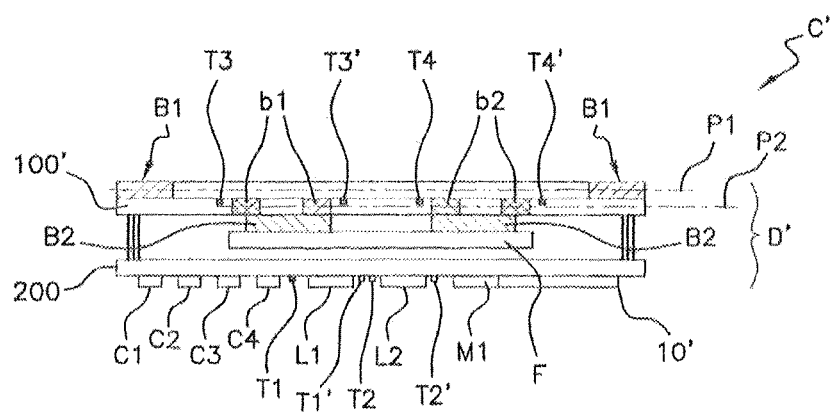
FIG. 4 shows a sectional view of the inductive charger comprising the approach-detection and communication apparatus according town aspect of the invention.

In FIG. 4, the apparatus D' is incorporated within an inductive charger C' for a mobile device P.

According to an aspect of the invention, the near-field communication and approach-detection apparatus D' further comprises:

at least one conductive element b1, b2, located under the receiving surface S;

selection means T1, T1', T2, T2', T3, T3', T4, T4', located on each side of the component L1, L2, C1, C2, C3, C4 and on each side of the conductive element b1, b2, each having two positions:

a first position in which the component L1, L2, C1, C2, C3, C4 is connected to the power supply line A and the conductive element b1, b2 is disconnected from the power supply line A;

a second position in which the conductive element b1, b2 is connected to the power supply line A and the component L1, L2, C1, C2, C3, C4 is disconnected from the power supply line A;

means M1 for measuring a variation in an electrical parameter of the conductive element b1 when the selection means are in the second position so as to detect the approach of said mobile device P toward the receiving surface S;

control means M2, Inv1 for the selection means T1, T1', T2, T2', T3, T3', T4, T4'.

The term "conductive element" is understood to mean any component made of conductive metal, made of copper for example, a winding of copper wire, or a surface made of copper.

The NFC antenna B1 defining a first plane P1, the conductive element b1, b2 is preferably located in a second plane P2, running parallel to the first plane P1, either above or below the first plane P1 and below the receiving surface S (see FIG. 4).

The selection means T1, T1', T2, T2', T3, T3', T4, T4' are switches taking for example the form of transistors.

The component L1, L2, C1, C2, C3, C4 is connected, across its terminals, to the power supply line A. An aspect of the invention proposes positioning a selection means T1, T1', T2, T2', T3, T3', T4, T4', more specifically a switch, on each side of said component, i.e. at each of its terminals.

An aspect of the invention will be explained below by taking the first inductor L1 to be the component and by taking the conductive element b1 to be a winding of copper wire. Of course, an aspect of the invention applies to all of the components L2, C1, C2, C3, C4 in the same way.

Figure 5:
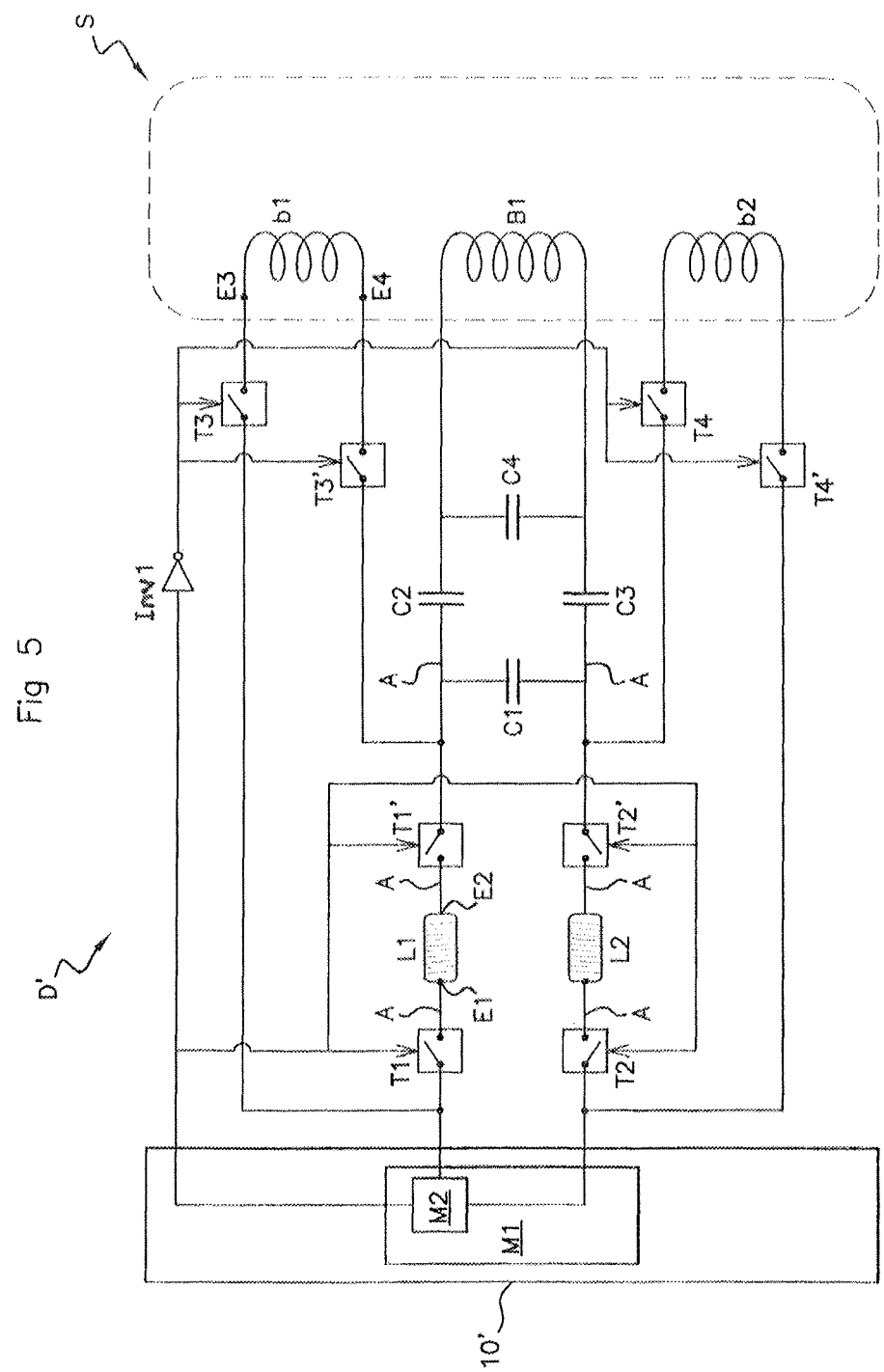
FIG. 5 shows the approach-detection and communication apparatus according to an aspect of the invention.
Figure 6:
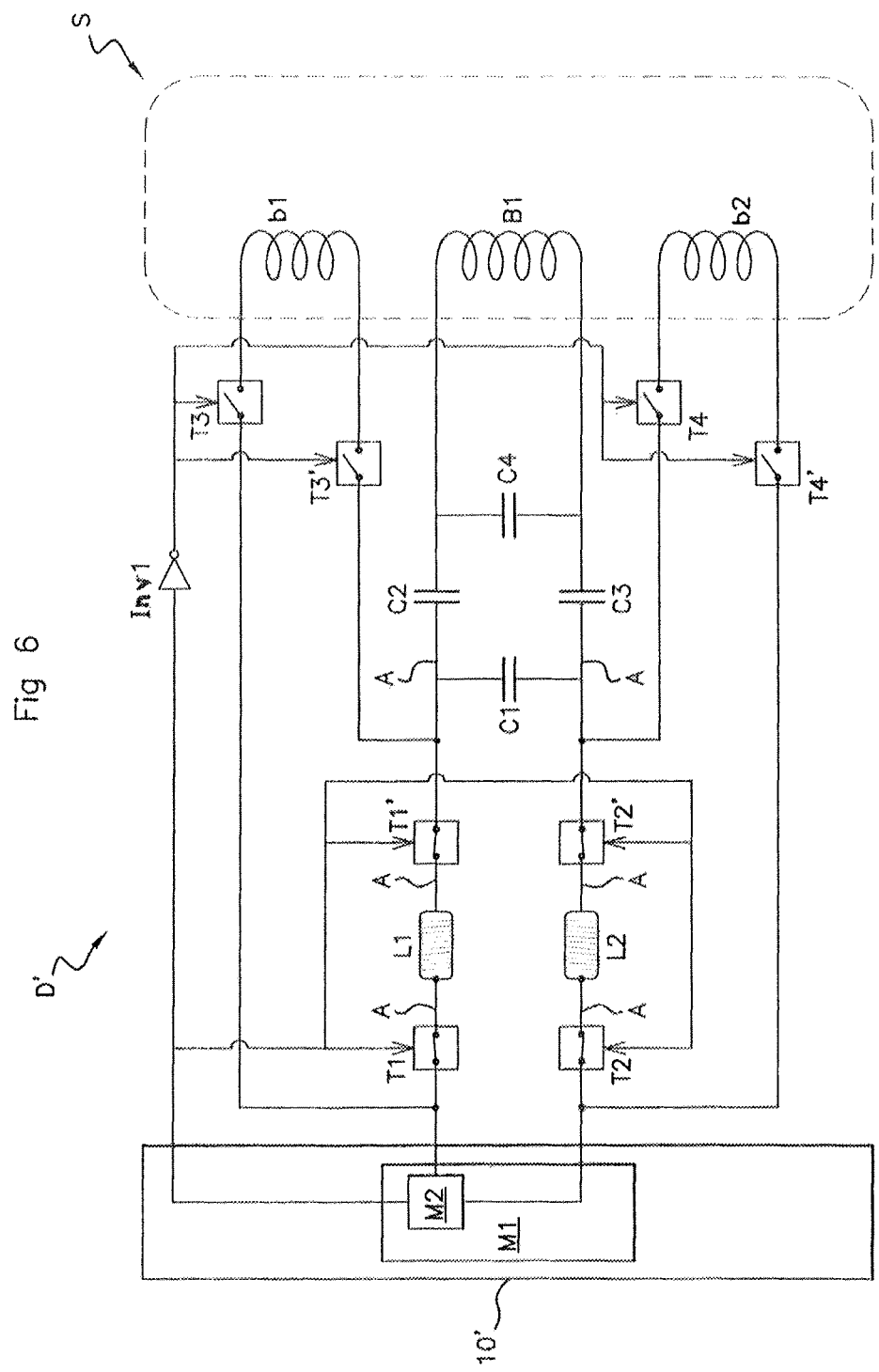
FIG. 6 shows the approach-detection and communication apparatus according to an aspect of the invention in near-field communication mode.
Figure 7:
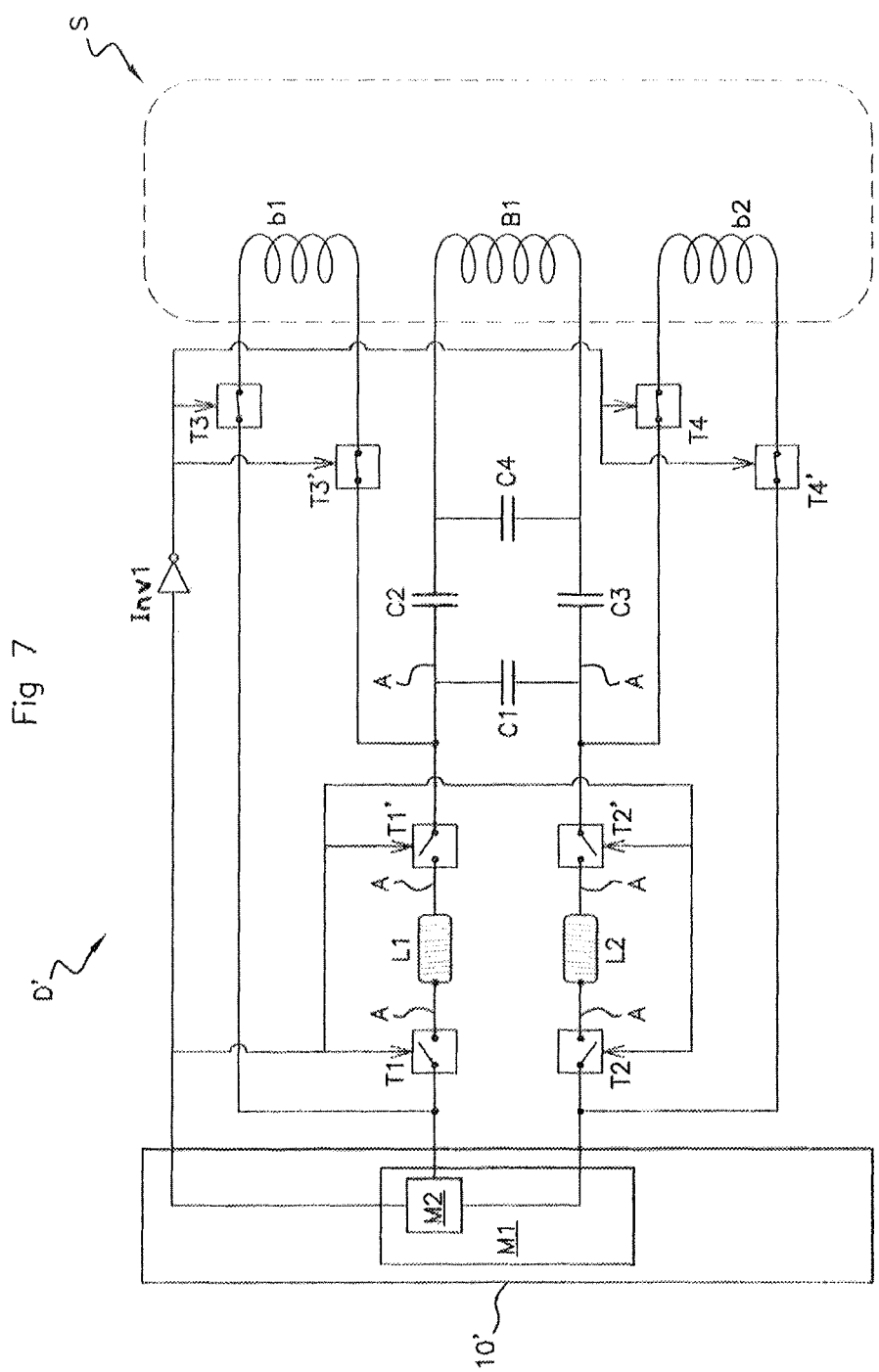
FIG. 7 shows the approach-detection and communication apparatus according to an aspect of the invention in near-field detection mode.

In FIGS. 5 to 7, an aspect of the invention is shown being applied to the first inductor L1 and to the second inductor L2. An aspect of the invention will be explained below only for the first inductor L1 but is applicable, mutatis mutandis, to the second inductor L2 with the corresponding selection means T2, T2', T4, T4' and conductive element b2.

The component L1 is connected on a first side E1 to a first selection means T1 and on a second side E2 to a second selection means T1', and the conductive element b1 is similarly connected on a first side E3 to a third selection means T3 and on a second side E4 to a fourth selection means T3' (see FIG. 5).

The selection means T1, T1', T3, T3' each have two positions such that:
- in a first position, the component L1 is connected to the power supply line A and the conductive element b1 is disconnected from the power supply line A, as illustrated in FIG. 6;
- in a second position, the conductive element b1 is connected to the power supply line A and the component L1 is disconnected from the power supply line A, as illustrated in FIG. 7.

More specifically, the selection means T1, T1', T3, T3' take the form of switches:
- in the first position, the first selection means and the second selection means T1, T1' are closed and the third selection means and the fourth selection means T3, T3' are open; and
- in the second position, the first selection means and the second selection means T1, T1' are open and the third selection means and the fourth selection means T3, T3' are closed.

The control means M2, Inv1 for the selection means T1, T1', T3, T3' allow the first or second position of said selection means to be actuated.

Said control means comprise for example a transistor Inv1 and means M2 for controlling said transistor Inv1.

Said control means may also take the form of an inverter circuit (i.e. logic-gate integrated components), which are not shown in FIGS. 5 to 7.

The control means M2, Inv1 are designed:
- to automatically open the third selection means and the fourth selection means T3, T3' (T4 and T4', respectively, for the second inductor L2) if the first and second selection means T1, T1' (T2, T2', respectively, for the second inductor L2) are closed;
- to close the third selection means and the fourth selection means T3, T3' (T4 and T4', respectively, for the second inductor L2) if the first and second selection means T1, T1' (T2, T2', respectively, for the second inductor L2) are open.

In other words, in the first position, the NFC antenna is connected to the electronic component L1 by the power supply line A, and, in the second position, the NFC antenna is connected to the conductive element b1 by the power supply line A.

Preferably, an aspect of the invention makes provision, when the selection means are in the first position, for the component L1 to take a predetermined physical value, for example 470<nH, while, when the selection means are in the second position, the conductive element b1 is adjusted to take substantially the same predetermined physical value, i.e. around 470 nH.

The first and second selection means T1, T1' are preferably located on the second printed circuit board 200, while the third and fourth selection means T3, T3' are preferably located on the first printed circuit board 100 (see FIG. 4).

An aspect of the invention is also applicable to the capacitors C1, C2, C3, C4. In the case in which the component is a capacitor of predetermined physical value, for example C1=120 pF, then the conductive element (not shown) takes the form of an electrode (not shown) of predetermined physical value substantially equal to 120 pF. The term "substantially equal" is understood to mean a value that is within +/− 10% of the predetermined physical value.

The measurement means M1 measure the variation in voltage or in phase across the terminals of the conductive element b1 or across the terminals of the assembly made up of the conductive element b1 and the NFC antenna B1. The measurement means M1 are for example located in the microcontroller 10.

The near-field communication and approach-detection method will now be described.

In a first step, the communication and approach-detection apparatus D' is in a detection phase, and the selection means T1, T1', T3, T3' are activated so as to be in the second position.

The conductive element b1 is therefore electrically connected to the measurement means M1 that are located in the microcontroller 10 and to the NFC antenna.

Since the conductive element b1 is positioned under the receiving surface S and consists of conductive metal, the approach of the mobile device P causes a variation in voltage across the terminals of said conductive element b1, which is measured by the measurement means M1.

If the variation in voltage exceeds a predetermined threshold, the approach or the placement of the mobile device P toward or on the receiving surface S is confirmed.

Once the placement of the mobile device P has been confirmed, the detection phase is ended and the communication phase commences, and the selection means T1, T1', T3, T3' are then activated so as to be in the first position.

In this position, the NFC antenna B1 is connected to the first inductor b1 and to the microcontroller 10 and operates as a near-field communication antenna, like in the prior art.

Moreover, the conductive element b1 preferably taking the same physical value, here the same inductance, as the component L1, whether it is in the detection phase or in the communication phase, the apparatus D' stays matched so that it exhibits the same impedance in the detection phase and in the communication phase so as to obtain the longest communication range.

Of course, it is possible for the conductive element b1 not to exhibit the same inductance as the component L1. In this case, the use of different inductance values results in energy losses in the detection phase and hence less reliable or less accurate detection.

FIGS. 5 to 7 show one embodiment in which an aspect of the invention is applied to the two inductors L1, L2, each being able to be disconnected from the power supply line A and each being able to be "replaced" by a coil b1, b2, respectively.

Figure 8:
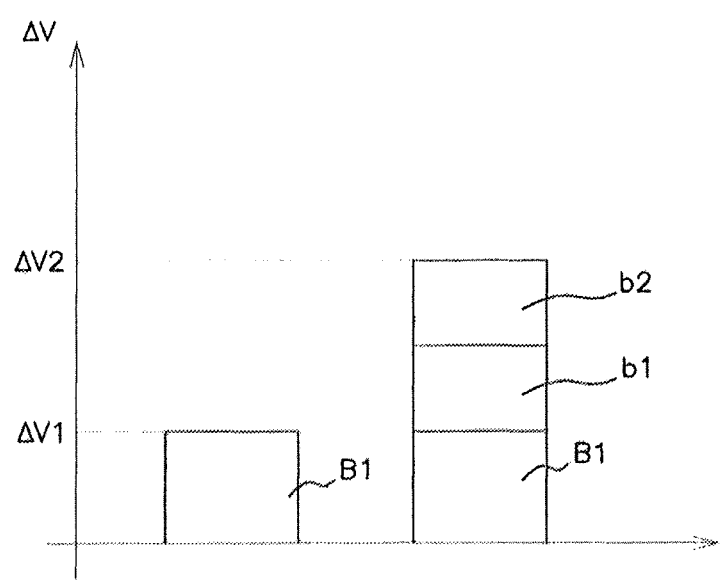
FIG. 8 is a graph illustrating the gain in sensitivity with the variation in voltage across the terminals of the coils of the near-field communication and approach-detection apparatus, according to an aspect of the invention, for detecting the approach of a mobile device.

FIG. 8 illustrates the gain in sensitivity when detecting the approach of the mobile device P using the apparatus D' of an aspect of the invention according to the embodiment shown in FIGS. 5 to 7. The variation in voltage ΔV caused by the approach of the mobile device P is smaller and equal to ΔV1 with the apparatus of the prior art, i.e. with just the NFC antenna B1 present, than with the apparatus D' of an aspect of the invention, in which the variation ΔV2 is therefore greater due to the presence of the two additional coils b1, b2.

An aspect of the invention could of course be applied only to the capacitors, these being able to be disconnected from the power supply line A and each one "replaced" with an electrode located under the receiving surface C. By measuring the variation in voltage across the terminals of said electrodes, approach detection is enhanced with respect to the prior art.

Lastly, an aspect of the invention may be applied to any of the components, inductors and/or capacitors.

An aspect of the invention therefore allows reliable and robust detection of a mobile device and effective and stable near-field communication with said device while decreasing power consumption and the level of radiation emitted in the detection phase.

An aspect of the invention is ingenious, straightforward to implement and inexpensive.

The invention claimed is:

1. An inductive charger for a mobile device, intended to be installed on board a motor vehicle, comprising a charging antenna and an apparatus for detecting the approach of said mobile device and for near-field communication with said device, comprising an NFC antenna that is arranged under a receiving surface that is suitable for receiving said mobile device, at least one matching component comprising at least one inductor and/or at least one capacitor, and an electronic control unit, the control unit, the component and the NFC antenna being electrically connected to one another by a power supply line and being capable of near-field communication with the mobile device during a charging period, the NFC antenna not enabling the approach of said mobile device to be detected, said detection apparatus further comprising:
   at least one conductive element, under the receiving surface;
   selection means, located on each side of the component and on each side of the conductive element, each having two positions:
   a first position in which the component is connected to the power supply line and the conductive element is disconnected from the power supply line;
   a second position in which the conductive element is connected to the power supply line and the component is disconnected from the power supply line;
   means for measuring a variation in an electrical parameter of the conductive element when the two selection means are in the second position so as to detect the approach of said mobile device toward the receiving surface;
   control means for the selection means.

2. The inductive charger as claimed in claim 1, wherein, the NFC antenna defining a first plane, the conductive element is located in a second plane that runs parallel to the first plane.

3. The inductive charger as claimed in claim 2, wherein if the component is an inductor, then the conductive element takes the form of a coil.

4. The inductive charger as claimed in claim 1, wherein if the component is a capacitor, then the conductive element takes the form of an electrode.

5. The inductive charger as claimed in claim 1, wherein, the component taking a predetermined physical value, then the conductive element is adjusted so as to take substantially the same predetermined physical value.

6. A near-field communication and approach-detection method using a near-field communication and approach-detection apparatus, incorporated within an inductive charger, that is intended to be installed on board a motor vehicle, comprising a charging antenna and comprising an NFC antenna that is located under a receiving surface that is suitable for receiving the mobile device, at least one matching component and an electronic control unit, the control unit, the component and the NFC antenna being electrically connected to one another by a power supply line, and being capable of near-field communication with the mobile device during a charging period, the NFC antenna not enabling the approach of said mobile device to be detected, the method comprising a phase of detecting said mobile device in which:
   the component is disconnected from the power supply line;
   instead of the component, a conductive element that is located under the receiving surface is connected to the power supply line;
   variations in an electrical parameter of the conductive element are measured so as to detect the approach of the mobile device toward the receiving surface.

7. The detection method as claimed in claim 6, wherein if a mobile device is detected on the receiving surface, then:
   the conductive element is disconnected from the power supply line; and
   the component is reconnected to the power supply line,
so as to communicate with said mobile device.

8. The detection method as claimed in claim 7, wherein, the component taking a predetermined physical value when connected to the power supply line, the conductive element is adjusted so as to take substantially the same physical value when connected to the power supply line.

* * * * *